United States Patent [19]

Takeuchi et al.

[11] Patent Number: 4,554,786
[45] Date of Patent: Nov. 26, 1985

[54] VACUUM SOURCE DEVICE FOR VACUUM BOOSTER FOR VEHICLES

[75] Inventors: Hiroo Takeuchi, Asashina; Kazuo Miyazaki, Shiki, both of Japan

[73] Assignees: Nissin Kogyo Kabushiki Kaisha, Nagano; Honda Giken Kogyo Kabushiki Kaisha, Tokyo, both of Japan

[21] Appl. No.: 533,023

[22] Filed: Sep. 16, 1983

[30] Foreign Application Priority Data

Sep. 16, 1982 [JP] Japan .................................. 57-161370
Jul. 28, 1983 [JP] Japan .................................. 58-138443

[51] Int. Cl.⁴ .............................................. F16D 31/02
[52] U.S. Cl. .......................................... 60/397; 91/6; 417/151
[58] Field of Search ...................... 60/397; 417/87, 189; 91/6, 31

[56] References Cited

U.S. PATENT DOCUMENTS

| | | | |
|---|---|---|---|
| 1,820,884 | 8/1931 | Hueber et al. ................... | 417/189 X |
| 3,094,843 | 6/1963 | Martin .............................. | 60/397 X |
| 4,109,464 | 8/1978 | Wickland ............................. | 60/397 |
| 4,134,470 | 1/1979 | Riddel ............................. | 417/190 X |
| 4,211,200 | 7/1980 | Rocchio et al. ................... | 91/31 X |
| 4,380,418 | 4/1983 | Crawford et al. ................ | 60/397 X |

Primary Examiner—Edward K. Look
Attorney, Agent, or Firm—Armstrong, Nikaido, Marmelstein & Kubovcik

[57] ABSTRACT

A vacuum source device of vacuum booster is disclosed. The device includes an air ejector having an air inlet communicated with the atmosphere, an air outlet connected to a vacuum pick-up port opening to the portion of the intake system of an internal combustion engine downstream of a throttle valve, and a pressure reduction chamber connected to a vacuum chamber of the vacuum booster. A by-pass passage connecting between the vacuum pick-up port and the vacuum chamber of the vacuum booster by detouring the diffuser of the air ejector imposes a smaller flow resistance than the diffuser. A first check valve is disposed in the by-pass passage, while a second check valve is disposed between the by-pass passage and the vacuum chamber.

9 Claims, 8 Drawing Figures

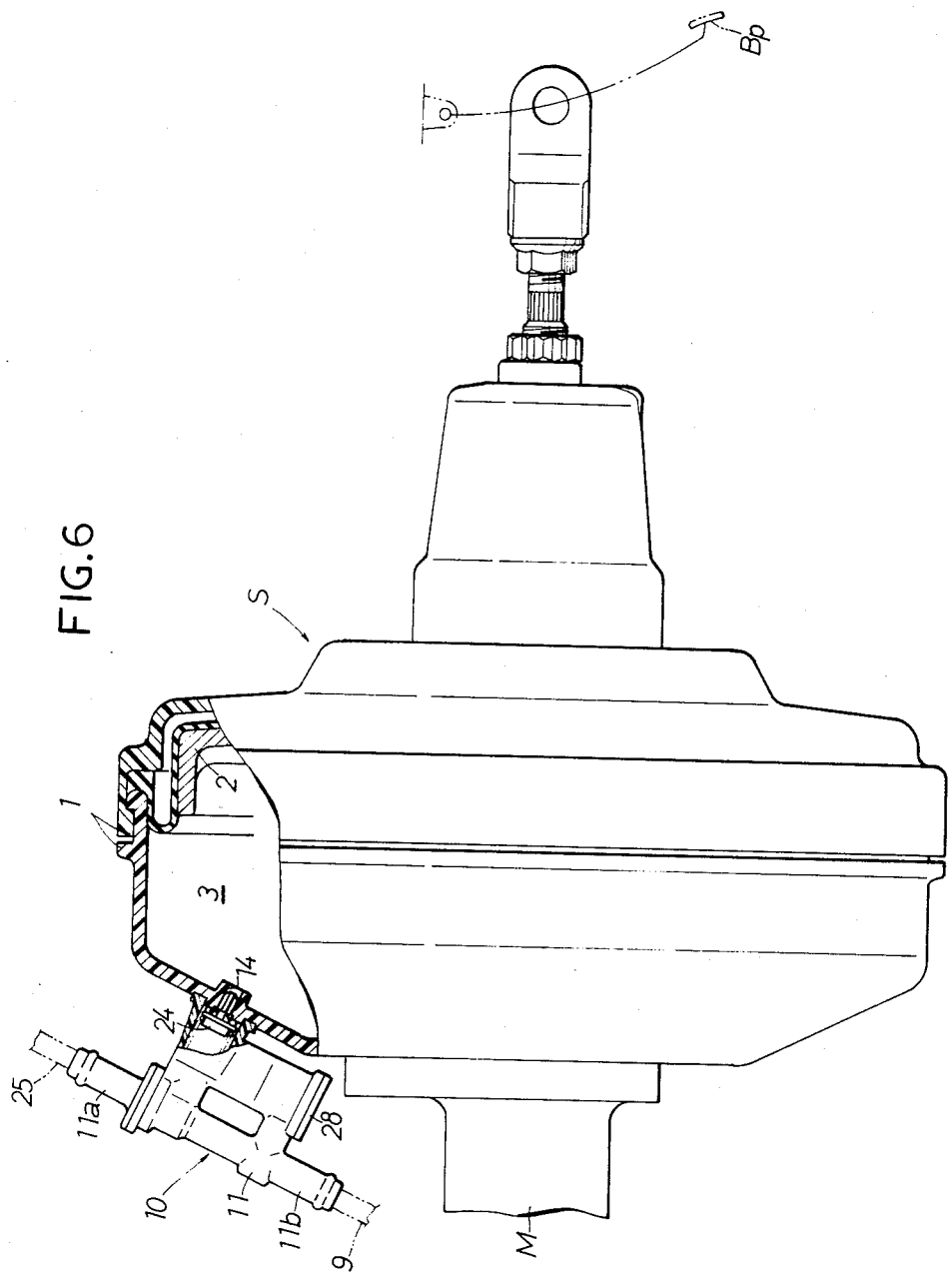

VACUUM SOURCE DEVICE FOR VACUUM BOOSTER FOR VEHICLES

BACKGROUND OF THE INVENTION

1. Field of the Invention

The present invention relates to a vacuum source device of a vacuum booster which is used for boosting, for example, the brake master cylinder in automobile or the like vehicles.

2. Description of the Prior Art

The vacuum source of conventional vacuum booster for vehicles has a vacuum chamber which is connected through a check valve to a vacuum pick-up port opening to a portion of the intake system downstream of the throttle valve of an internal combustion engine, so as to accumulate the vacuum which serves as the power source for the vacuum booster.

The level of the vacuum established in internal combustion engine varies depending on the type of employed engine and kinds of accessories attached to the engine. For instance, when the engine is 2-cycle engine or an engine equipped with a multiple type carburetor or when the engine incorporates an automatic transmission, the level of the vacuum is as low as $-300$ to $-400$ mmHg, while ordinary engine can produce a vacuum which is as high as $-500$ mmHg or so. When only a low level of vacuum is available such as in a conventional vacuum booster, it is necessary to increase the pressure-receiving area in the booster to obtain the necessary boosting ratio. This, however, requires an increase in the size of the booster as a whole, making it difficult to mount the booster in a limited space in the engine room.

SUMMARY OF THE INVENTION

Accordingly, an object of the invention is to provide a simple and effective vacuum source for vacuum booster, employing an air ejector which ensures the supply of sufficiently high vacuum necessary for the operation of the booster even when the level of the intake vacuum in the engine is low, thereby to overcome the above-described problems of the prior art.

To this end, according to the invention, there is provided a vacuum source device of a vacuum booster for use in vehicle engines, comprising an air ejector having an air inlet communicated with the atmosphere and an air outlet connected to a vacuum pick-up port opening to a portion of the intake system downstream of the throttle valve of the engine, the air ejector having a pressure reduction chamber connected to the vacuum chamber of the vacuum booster.

Further, according to the invention, a by-pass passage is formed to connect the vacuum chamber of the vacuum booster directly to the vacuum pick-up port by detouring a diffuser of the air ejector, the by-pass passage having a smaller flow resistance than the diffuser and being provided with a first check valve, while a second check valve is disposed between the by-pass passage and the vacuum chamber.

According to a feature of the invention, the air inlet of the air ejector is connected to the atmosphere through an air cleaner provided in the intake system of the engine.

According to another feature of the invention, the first and second check valves are constructed as a unit with the body of the air ejector.

According to a further feature of the invention, the body of the air ejector having the first and second check valves mounted therein is united with the booster shell of the vacuum booster.

With the arrangement mentioned above, the vacuum chamber of the vacuum booster can be supplied with a vacuum which is established in the pressure reduction chamber of the air ejector by the operation of the intake vacuum in the engine and which has a level higher than the intake vacuum produced in the engine. It is, therefore, possible to obtain the desired boosting ratio without requiring any increase in the pressure-receiving area of the vacuum booster. In addition, since no specific fluid pump is required for the driving of the air ejector, it is possible to obtain a vacuum source device of a simple construction at a reduced cost. Furthermore, the frequency of occurrence of trouble or failure is decreased because no movable part is incorporated.

The arrangement of the vacuum source device of the invention offers also the following advantage thanks to the provision of the first check valve in the by-pass passage which directly connects the vacuum pick-up port to the vacuum chamber of the vacuum booster detouring the diffuser of the air ejector and which imposes a smaller flow resistance than the diffuser. Namely, until the vacuum in the vacuum chamber of the booster is raised to the level of the intake vacuum in the engine after the start up of the engine, the intake vacuum is transmitted to the vacuum chamber of the vacuum booster through the by-pass passage due to small flow resistance therein, so that the level of vacuum in the vacuum chamber is increased rapidly to make the vacuum booster operative in quite a short period of time. When the suction vacuum of the air ejector is increased to a level higher than the intake vacuum of the engine, the first check valve is closed, so that the suction vacuum of the air ejector is supplied not to the by-pass passage but to the vacuum chamber of the vacuum booster without fail.

The provision of the second check valve between the by-pass passage and the vacuum chamber offers the following advantage. Namely, when the intake vacuum of the engine has come down or been extinguished, the second check valve is closed to prevent reverse flow of the vacuum from the vacuum chamber to the vacuum passage, thereby to prevent reduction of the vacuum in the vacuum chamber.

The air ejector can suck, when connected at its air inlet to the air cleaner of the intake system, fresh ambient air without requiring any additional air cleaner. With such an arrangement, therefore, the construction is further simplified and the normal operation is ensured for a longer period of time without suffering from the problems such as clogging by dust and other contaminants.

Furthermore, when the first and second check valves are mounted in the body of the ejector, the check valves are united with the air ejector to eliminate the necessity for pipings which interconnect the ejector and the check valves, contributing further to the simplification of construction and the reduction in the production cost.

In addition, by uniting the air ejector incorporating the first and second check valves with the booster shell of the vacuum booster, it is possible to neglect the pipings between the air ejector and the vacuum booster and to reduce the number of parts, thereby to further contribute to the simplification of construction and reduction of cost.

BRIEF DESCRIPTION OF THE DRAWINGS

FIG. 6 is a partly-sectioned enlarged side elevational view of a vacuum booster and an air ejector of the embodiment shown in FIG. 5;

DESCRIPTION OF THE PREFERRED EMBODIMENTS

Figure 1:
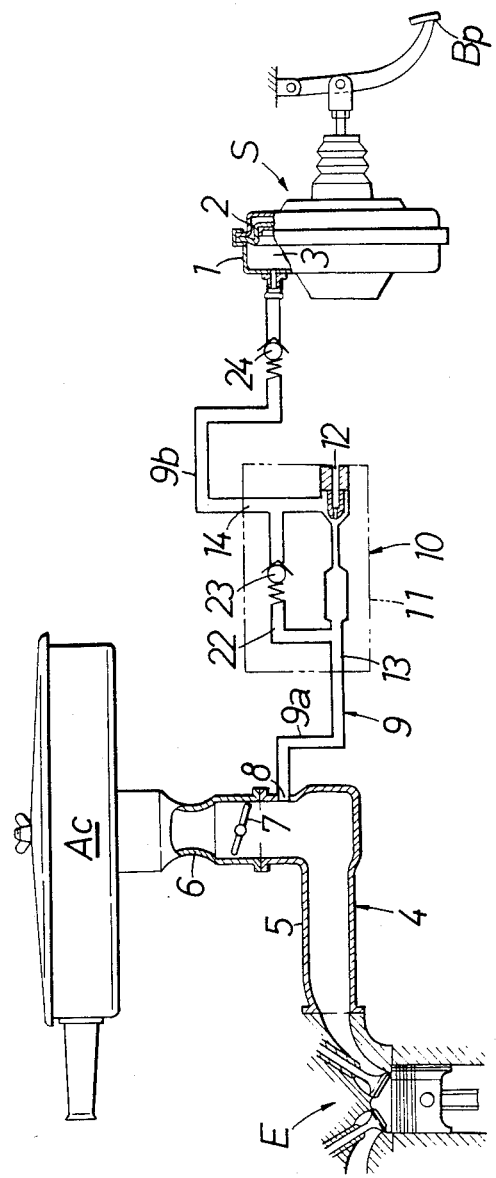
FIG. 1 is a schematic side elevational view of a first embodiment of the vacuum source device of the invention.

Preferred embodiments of the invention will be described hereinunder with reference to the accompanying drawings. Throughout the description of these embodiments, the same reference numerals and symbols are used to denote the same or corresponding parts or members.

A first embodiment of the invention will be explained with specific reference to FIGS. 1 and 2. Referring first to FIG. 1, a known vacuum booster denoted at "S" and adapted for operating the brake master cylinder of an automobile is adapted to be operated by means of a brake pedal Bp. The vacuum booster has a booster shell 1 in which defined is a vacuum chamber 3 by means of a booster piston 2 having a diaphragm. An internal combustion engine E of an automobile has an intake system 4 having an intake manifold 5, a carburetor 6 and an air cleaner Ac connected to the upstream side of the carburetor 6. The carburetor 6 is provided with a throttle valve 7 as in the cases of conventional carburetors. The intake system 4 is provided at its portion downstream of the throttle valve 7 with a vacuum pick-up port 8. An air ejector 10 is disposed in a manner explained hereinunder, in a vacuum passage 9 which connects between the vacuum pick-up port 8 and the vacuum chamber 3 of the vacuum booster S. The portion of the vacuum passage 9 between the vacuum pick-up port 8 and the air ejector 10 will be referred to as "upstream vacuum passage 9a", while the portion of the same between the air ejector 10 and the vacuum chamber 3 will be referred to as "downstream vacuum passage 9b", hereinunder.

Figure 2:
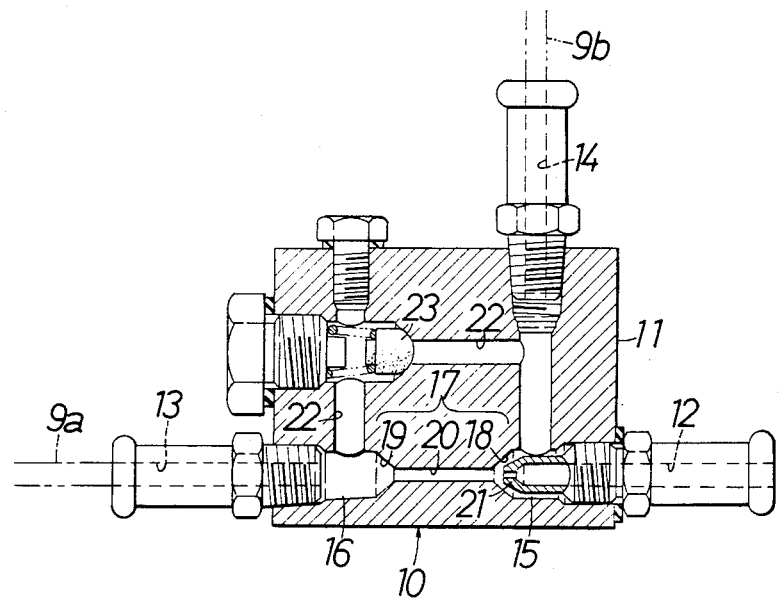
FIG. 2 is an enlarged sectional side elevational view of the embodiment shown in FIG. 1, illustrating the portion around an air ejector constituting an essential part of the embodiment.

As shown in FIG. 2, the body 11 of the air ejector 10 has an air inlet opening in the front side thereof, an air outlet 13 opening in the rear side thereof, a suction port 14 opening in the lateral side thereof, a pressure reduction chamber 15 and an outlet chamber 16 which communicate with the suction port 14 and the air outlet 13, respectively, and a diffuser 17 through which the chambers 15 and 16 are communicated with each other. The air outlet 13 is connected to the downstream end of the upstream vacuum passage 9a, while the suction port 14 is connected to the upstream end of the downstream vacuum passage 9b. The diffuser 17 is constituted by a converging tapered portion 18 formed on one end surface of the pressure reduction chamber 15, a diverging tapered portion 19 formed on one end surface of the outlet chamber 16 and a throat portion 20 through which both tapered portions 18 and 19 are connected to each other. A nozzle 21, communicating with the air outlet 13 and having a nozzle port directed towards the throat portion 20, is disposed within the pressure reduction chamber 15, in the close proximity of the converged tapered portion 18.

Furthermore, the body 11 of the air ejector has a by-pass passage 22 detouring the diffuser 17 and imposing a smaller flow resistance than the diffuser 17. A first check valve 23 is disposed in the by-pass passage 22. As shown in FIG. 1, the vacuum passage 9b between the by-pass passage 22 and the vacuum chamber 3 has a second check valve 24. Both of the first and second check valves are adapted to check the reversing of the vacuum from the vacuum chamber towards the vacuum pick-up port 8.

The operation of this embodiment is as follows. As the internal combustion engine E is started to generate a vacuum in the portion of the intake system 4 downstream of the throttle valve 7, the intake vacuum is picked-up through the vacuum pick-up port 8 to act in the outlet chamber 16 and the by-pass passage 22 through the upstream vacuum passage 9a. The vacuum acting in the by-pass passage 22 forcibly opens the first check valve 23 to be transmitted to the downstream vacuum passage 9b and then opens the second check valve 24 to flow into the vacuum chamber 3 of the vacuum booster S, so as to be stored in the vacuum chamber 3.

On the other hand, the vacuum acting in the outlet chamber 16 is transmitted to the nozzle port of the nozzle 21 through the diffuser 17, so that the nozzle 21 sucks the ambient air through the air inlet 12 and jets the same towards the diffuser 17 to generate jetting flow of air of high velocity. As a result, the pressure in the pressure reduction chamber 15 is reduced so that air is induced from the suction port 14 thereby to further decrease the pressure in the downstream vacuum passage 9b, i.e. to increase the level of vacuum in the vacuum chamber 3. As the level of the vacuum in the pressure reduction chamber 15 gets higher than that of the intake vacuum in the engine E, the first check valve 23 is closed so that the vacuum in the pressure reduction chamber 15 is introduced into the vacuum chamber 3 without being transmitted to the by-pass passage 22. In consequence, the vacuum which is the sum of the intake vacuum of the engine E and the suction vacuum produced by the air ejector 10 is stored in the vacuum chamber 3.

When the intake vacuum of the engine E is drastically decreased or extinguished as a result of an acceleration of the engine E by rapid opening of the throttle valve 7 or the stopping of the engine, the pressure reducing power of the air ejector 10 is decreased or reduced to zero. However, since the second check valve 24 is closed without delay, the vacuum in the vacuum chamber 3 is never leaked through the vacuum passage 9.

In the case where the length of time taken after the start up of the engine E till the vacuum in the vacuum chamber 3 reaches the level of the intake vacuum of the engine E does not matter, it is possible to delete the by-pass passage 22 and the first check valve 23.

Figure 3:
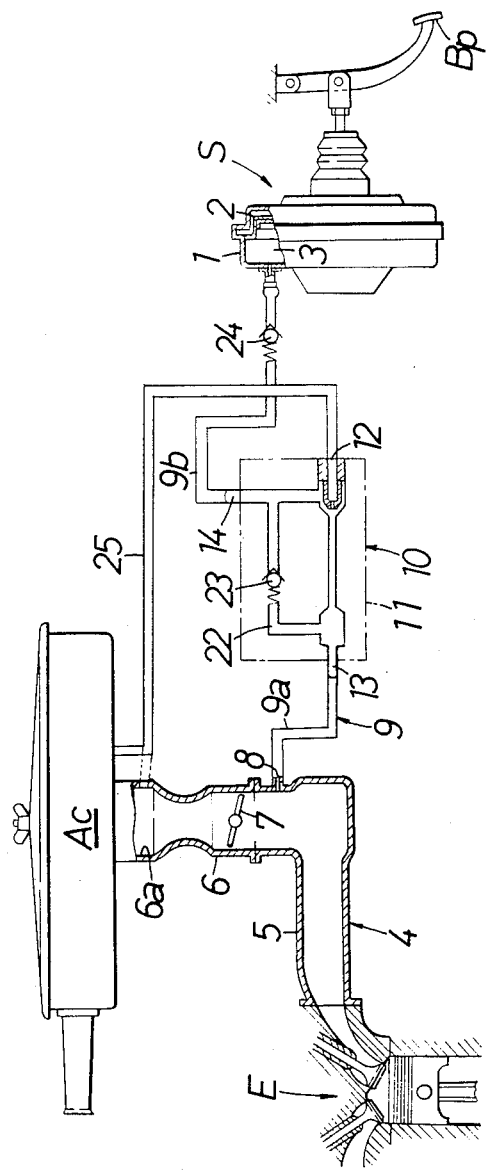
FIG. 3 is a schematic side elevational view of a second embodiment of the vacuum source device of the invention.
Figure 5:
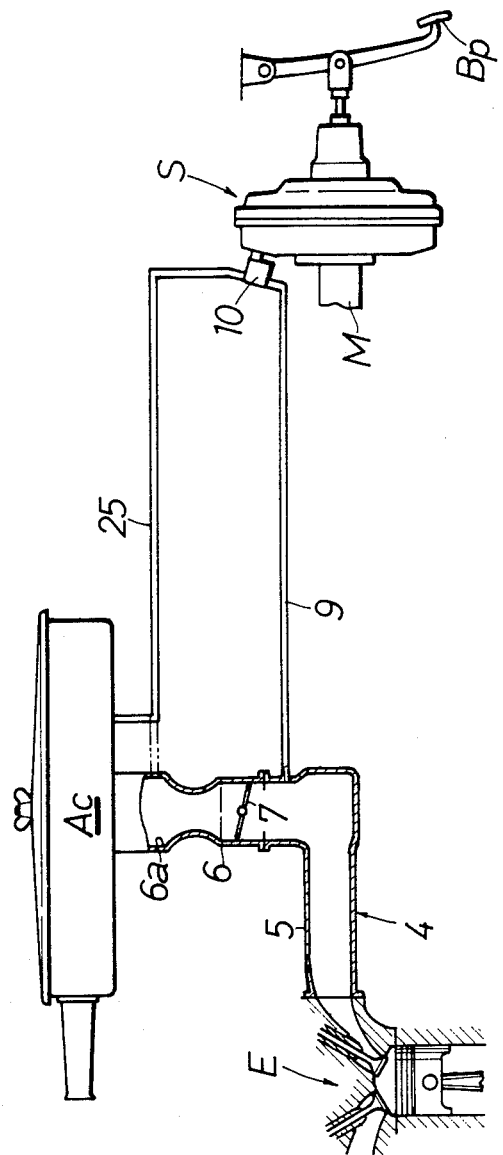
FIG. 5 is a schematic side elevational view of a fourth embodiment of the vacuum source device of the invention.

FIG. 3 shows a second embodiment of the invention, in which the air inlet 12 of the air ejector 10 is communicated with the atmosphere through an air passage 25 and an air cleaner Ac, so that the air ejector 10 can suck the air which has been cleaned by the air cleaner Ac. In consequence, the clogging of the air ejector by dust or the like is prevented, and the necessity for any specific air cleaner for the air ejector is eliminated. Although in the illustrated embodiment the air passage 25 is connected to the air cleaner Ac, this is not exclusive and the air passage can be connected to the portion of the carburetor 6 near the inlet of intake passage 6a thereof, as shown by chain line in FIG. 3. In either case, the air cleaned by the air cleaner Ac is introduced into the air passage 25 not to mention the carburetor 6.

Figure 4:
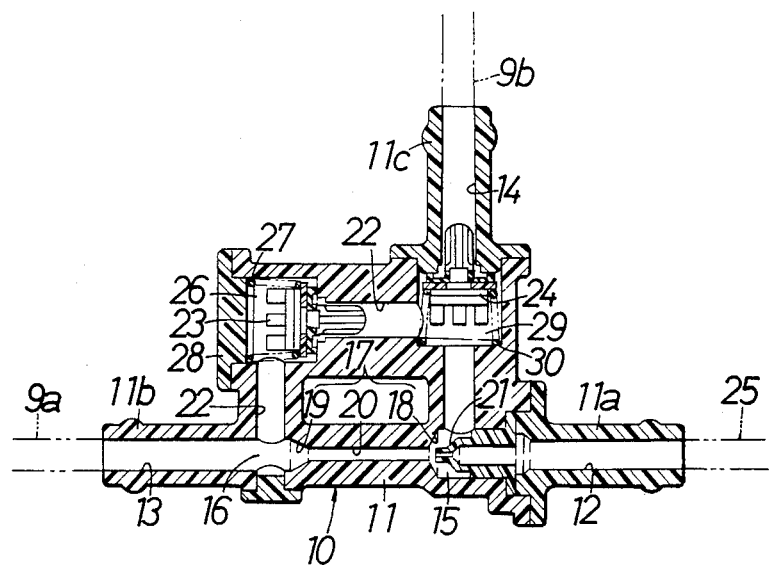
FIG. 4 is an enlarged sectional side elevational view of an air ejector constituting an essential part of a third embodiment of the vacuum source device of the invention.

FIG. 4 shows a third embodiment of the invention in which the body 11 of the air ejector 10 is shaped from a synthetic resin. The air ejector body 11 is composed of a first connecting pipe 11a projected from the front side of the body 11 and having an air inlet 12, a second connecting pipe 11b projected from the rear side of the body 11 and having an air outlet 13, a third connecting pipe 11c projected from a lateral side of the main body 11 and having a suction port 14, a pressure reduction chamber 15 and an outlet chamber 16 connected to the suction port 14 and the air outlet 13, respectively, and a diffuser 17 through which the chambers 15 and 16 are communicated with each other. Furthermore, the body 11 of the air ejector is provided with a by-pass passage 22 connecting between the air outlet 13 and the suction port 14 while detouring the diffuser 17 and imposing a smaller flow resistance than the diffuser 17. The by-pass passage 22 is provided with a first check valve 23, while a second check valve 24 is provided in the suction port 14.

The first check valve 23 is accommodated in a valve chamber 26 formed in a bend provided at an intermediate portion of the by-pass passage 22, and is biased by a valve spring 27 so as to close the end of the by-pass passage 22 adjacent to the suction port 14. The opening through which the first check valve 23 and other members are inserted is closed by a closure member or plug 28 welded or bonded to the body 11 of the air ejector 10. In this embodiment, the second check valve 24 is disposed in a valve chamber 29 formed at the juncture between the by-pass passage 22 and the suction port 14, unlike the first embodiment in which it is disposed at an intermediate portion of the downstream vacuum passage 9b. The second check valve 24 is biased by a valve spring 30 so as to close the suction port 14. The opening through which the second check valve 24 and other members are mounted is closed by the third connection pipe 11c which is welded or bonded to the body 11 of the air ejector.

As has been described, in the third embodiment of the invention, the first check valve 23 and the second check valve 24 are mounted in and united with the body 11 of the air ejector 10. In consequence, the pipings for connecting the air ejector to respective check valves are eliminated, and the attaching of the check valves 23,24 and the air ejector 10 to the vacuum passage 9 connecting the vacuum chamber 3 of the vacuum booster S and the vacuum pick-up port 8 is very much facilitated.

FIGS. 5 to 8 in combination show a fourth embodiment of the invention, in which the body 11 of the air ejector 10, united with the first and second check valves 23 and 24 as in the third embodiment, is formed integrally with the booster shell 1 of the vacuum booster S.

Figure 7:
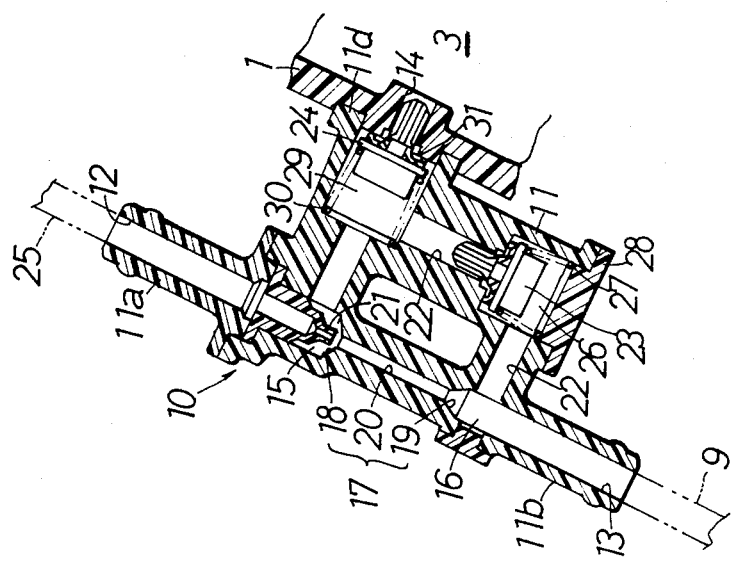
FIG. 7 is a further enlarged sectional side elevational view of the air ejector of the embodiment shown in FIG. 5.

As will be clearly seen from FIG. 7, the main body 11 of the air ejector 10 is formed from a synthetic resin, and is provided with a connecting boss 11d projected from one lateral side thereof. The connecting boss 11d is welded to the upper front surface of the booster shell 1.

The suction port 14 communicating with the vacuum chamber 3 of the vacuum booster S is formed in the portion of the booster shell 1 at which it is connected to the connecting boss 11d.

The opening of the valve chamber 29 accommodating the second check valve 24 is adapted to be closed by the booster shell 1 in which the suction port 14 is formed. Therefore, the portion of the booster shell 1 opposing to the second check valve 24 serves as a valve seat 31 for cooperating with the second check valve 24.

Thus, in this fourth embodiment of the invention, the body 11 of the air ejector 10 is constructed as a unit with the booster shell 1 so that the construction of the vacuum booster including the vacuum source device is further simplified.

Furthermore, in this embodiment, the air inlet 12, second check valve 24, first check valve 23 and the air outlet 13 are arranged in the mentioned order from the upper side to the lower side when the air ejector body 11 is integrally attached to the booster shell 1, as will be clearly seen from FIG. 7. Therefore, even when the fuel in the intake system 4 happens to be introduced into the vacuum passage 9 due to, for example, blow-back taking place in the engine E, the fuel does not flow towards the suction port 14. Even if the fuel has happened to flow past the diffuser 17 and the first check valve 23, the fuel is sucked into the intake system 4 accompanying the downward flow of the air when the first check valve 23 is opened by the intake vacuum in the engine E. Therefore, the fuel does never come into the vacuum chamber 3 of the vacuum booster S.

In the described fourth embodiment, the air passage 25 is connected to the air cleaner Ac. The air passage 25, however, may be connected to the portion of the carburetor 6 near the inlet of the intake passage 6a thereof, as shown by chain line in FIG. 5, similarly to the foregoing embodiments.

Figure 8:
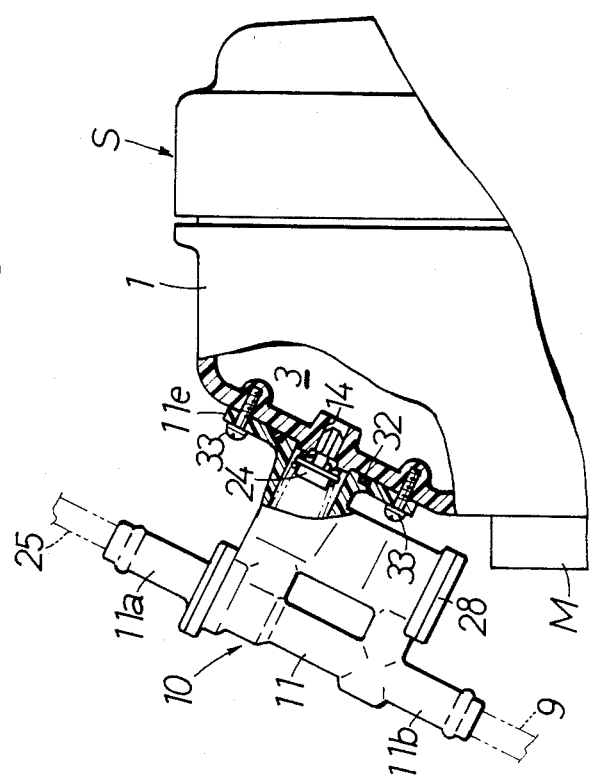
FIG. 8 is view similar to that in FIG. 6 and showing a modification of the embodiment shown in FIGS. 5 to 7.

FIG. 8 shows a modification of the fourth embodiment in which the body 11 of the ejector 10 is provided with a connecting flange 11e formed integrally therewith in place of the connecting boss 11d of the fourth embodiment. This connecting flange 11e is connected to the front surface of the booster shell 1 through a seal ring 32, by means of screws 33. Other portions of this modification are identical to those of the fourth embodiment.

While some preferred embodiments have been described heretofore, variations thereto will occur to those skilled in the art within the scope of the present inventive concepts which are delimited by the following claims.

What is claimed is:

1. A vacuum source device including dual check valves in combination with an intake system for a vacuum booster for vehicles said vacuum booster including a shell defining a vacuum chamber, said vacuum source device comprising:
(a) an air ejector including a body having a front surface, a rear surface and a side surface;
(b) an air inlet at the front surface of said body with an air inlet communicating with the atmosphere;
(c) an air outlet on the rear surface to lead to an opposed vacuum pick up port opening to the portion of the engine intake system downstream of a throttle valve;
(d) a suction port formed on the side surface and communicating with the vacuum chamber of the vacuum booster;
(e) a pressure reduction chamber communicating with said air inlet and also communicating with said suction port via a passage and an outlet chamber communicating with said air outlet;
(f) a diffuser connecting between said reduction chamber and said outlet chamber;
(g) a by-pass formed in said body for connecting between said outlet chamber and said suction port while detouring said diffuser of the air ejector;
(h) a first check valve disposed in said by-pass passage;
(i) a second check valve disposed in a valve chamber formed at a juncture between said suction port and said by-pass passage, and being in series flow relationship with said first check valve whereby said air ejector and said first and second check valves together constitute a unit, said suction port serves as an opening of said valve chamber for accommodating said second check valve and said unit is integrally attached to a front surface of the booster shell such that said opening meets an opening formed in the booster shell and that the portion of the booster shell surrounding the booster opening serves as a valve seat for the second check valve.

2. A vacuum source device according to claim 1, wherein said by-pass passage imposes a smaller flow resistance than the diffuser.

3. A vacuum source device according to claim 1, wherein said unit is provided around its opening with a connecting means, said connecting means being connected to the front surface of said booster shell.

4. A vacuum source device according to claim 3, wherein said connecting means is a connecting boss projecting from the side surface of the body, means welding said connecting boss to the booster shell.

5. A vacuum source device according to claim 3, wherein said connecting means is a connecting flange which is integral with the one side surface of the body and adapted to be superposed to the front surface of said booster shell through a seal ring.

6. A vacuum source device according to claim 1, wherein said body of the air ejector is made from a synthetic resin and is provided with a first connection pipe having said air inlet therein and projecting from the front surface thereof and a second connection pipe having said air outlet and projecting from the rear surface thereof.

7. A vacuum source device according to claim 6, wherein said ejector body is further provided with a third connection pipe having said suction port and projecting from the side surface of the body.

8. A vacuum source device according to claim 1 wherein said unit and said booster shell are connected integrally to each other, said air inlet, said second check valve, said first check valve and said air outlet are disposed in the mentioned order from an upper side of the unit to a lower side thereof in its mounted state.

9. A vacuum source device according to claim 1, wherein said vacuum diffuser is composed of a converging tapered portion formed on one end surface of said pressure reduction chamber, a diverging tapered portion formed on one end surface of said outlet chamber, and a throat portion connecting said tapered portions, said air ejector having a nozzle communicating with said air outlet and having a nozzle port directed towards said throat portion, said nozzle being disposed within said pressure reducing chamber and in the vicinity of said converging tapered portion.

* * * * *